United States Patent
Cheng et al.

(10) Patent No.: US 9,086,518 B2
(45) Date of Patent: Jul. 21, 2015

(54) LINEAR LIGHT SOURCE MODULE WITH TWO LIGHT GUIDES AND OPTICAL ASSEMBLY FOR SCANNER

(71) Applicant: AVISION INC., Hsinchu (TW)

(72) Inventors: Sung-Po Cheng, Hsinchu (TW); Thomas Sheng, Hsinchu (TW)

(73) Assignee: Avision Inc. (TW)

( * ) Notice: Subject to any disclaimer, the term of this patent is extended or adjusted under 35 U.S.C. 154(b) by 0 days.

(21) Appl. No.: 14/312,243

(22) Filed: Jun. 23, 2014

(65) Prior Publication Data

US 2015/0043044 A1 Feb. 12, 2015

(30) Foreign Application Priority Data

Aug. 7, 2013 (TW) ............................. 102214774 U

(51) Int. Cl.
- *H04N 1/04* (2006.01)
- *F21V 8/00* (2006.01)
- *H04N 1/028* (2006.01)

(52) U.S. Cl.
CPC .......... *G02B 6/0075* (2013.01); *H04N 1/02815* (2013.01); *G02B 6/001* (2013.01); *G02B 6/0055* (2013.01)

(58) Field of Classification Search
CPC ............. H04N 2201/0081; H04N 1/12; B65H 2404/14; B65H 2513/42; B65H 2513/53
See application file for complete search history.

(56) References Cited

U.S. PATENT DOCUMENTS

| | | | | |
|---|---|---|---|---|
| 6,166,832 A * | 12/2000 | Fujimoto | | 358/484 |
| 6,295,141 B1 * | 9/2001 | Ogura et al. | | 358/475 |
| 6,388,774 B1 * | 5/2002 | Kurata et al. | | 358/474 |
| 6,724,503 B1 * | 4/2004 | Sako et al. | | 358/483 |
| 7,817,316 B2 * | 10/2010 | Wei | | 358/506 |
| 7,954,988 B2 * | 6/2011 | Lee et al. | | 362/555 |
| 8,297,822 B2 * | 10/2012 | Lee et al. | | 362/555 |
| 8,379,275 B2 * | 2/2013 | Tahk et al. | | 358/475 |
| 8,944,667 B2 * | 2/2015 | Shin | | 362/634 |
| 2009/0015886 A1 * | 1/2009 | Kim et al. | | 358/484 |
| 2013/0100508 A1 * | 4/2013 | Shimoda | | 358/509 |
| 2014/0092444 A1 * | 4/2014 | Lee et al. | | 358/474 |

* cited by examiner

*Primary Examiner* — Negussie Worku

(57) ABSTRACT

A linear light source module comprises a holder, a first light guide, a second light guide, a first light-emitting element and a second light-emitting element. The first and second light guides are mounted on the holder and arranged in series, where the first light guide has a first emitting surface and the second light guide has a second emitting surface. The holder partially surrounds the first and second light guides. The first light-emitting element is disposed close to a first end of the first light guide, and a light beam emitted by the first light-emitting element is reflected and converted by the first light guide into first linear light emitted from the first emitting surface. The second light-emitting element is disposed close to a first end of the second light guide, and a light beam emitted by the second light-emitting element is reflected and converted by the second light guide into second linear light emitted from the second emitting surface. An optical assembly for a scanner using such linear light source module is also disclosed.

16 Claims, 7 Drawing Sheets

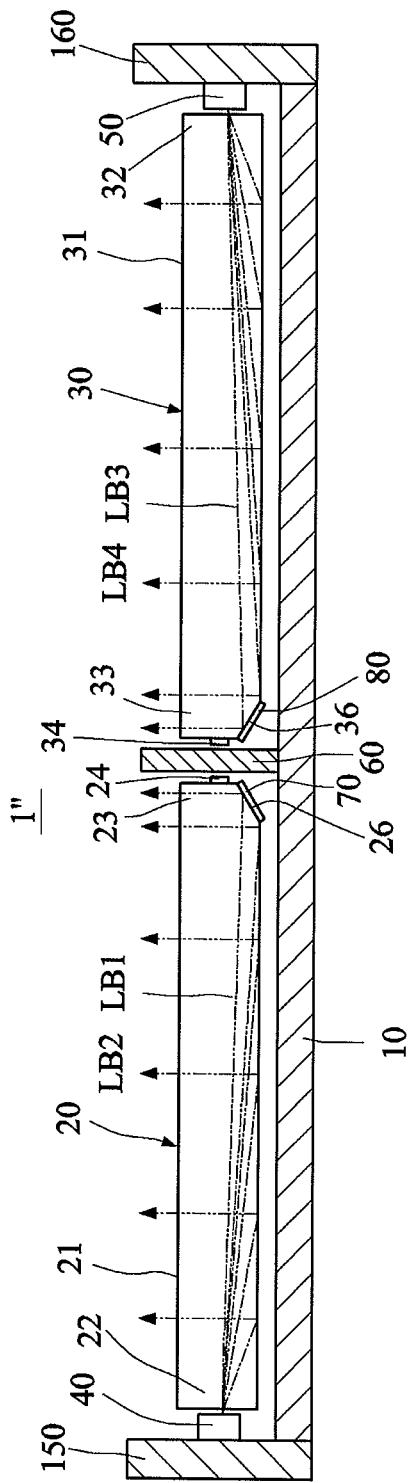
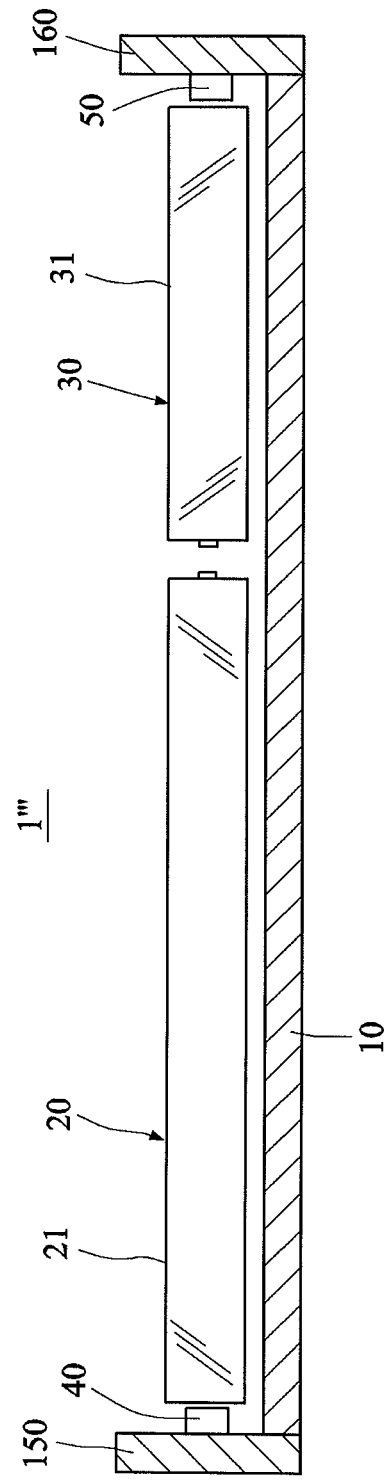
FIG. 6
FIG. 7

LINEAR LIGHT SOURCE MODULE WITH TWO LIGHT GUIDES AND OPTICAL ASSEMBLY FOR SCANNER

This application claims priority of No. 102214774 filed in Taiwan R.O.C. on Aug. 7, 2013 under 35 USC 119, the entire content of which is hereby incorporated by reference.

BACKGROUND OF THE INVENTION

1. Field of the Invention

The present invention relates to a linear light source module and an optical assembly for a scanner using such linear light source module, and more particularly to a linear light source module with two light guides and an optical assembly for a scanner using such linear light source module.

2. Related Art

Light-emitting diodes (LEDs) have been widely used as light sources because the LED advantageous has the high energy conversion efficiency, the power-saving property, the long lifetime, the small size and the like. In a scanner, the LED acts as a point light source for outputting light, which needs to be converted into a linear light source by a light guide so that the illumination light required to scan an original can be provided.

The typical light guide functions for the purpose of guiding light. So, almost the light guides are made of a transparent acrylic material by way of injection molding, where the injection molded product has one gate or multiple gates to facilitate the injection molding. In a longitudinal light guide, the gate is usually disposed on one end of the injection molded product so that the designer can effectively control the deformation, disorder, residual stresses and the like. The presence of the gate would not affect the illumination quality of the light guide when such the light guide is used in an illumination light source where the light is inputted from one single side of the light guide.

In order to make the linear light source module have higher illumination at two ends, dual-LED linear light source modules have been recently used, wherein LEDs are disposed on two ends of the light guide. However, the light guide has to be additionally trimmed by way of machining one end formed with a gate, or otherwise the light beam of the LED cannot effectively enter the light guide and the illumination of the light guide is indirectly affected.

SUMMARY OF THE INVENTION

Accordingly, the present invention has been proposed to solve the problems of the prior art, and it is an object of the present invention to provide a linear light source module with two light guides and an optical assembly for a scanner to enhance the overall brightness of the linear light source module and to facilitate the manufacturer in adjusting the brightness profile of the linear light source module to satisfy the requirements of different products on the brightness of the light source.

To achieve the above-identified object, the present invention provides a linear light source module comprising a holder, a first light guide, a second light guide, a first light-emitting element and a second light-emitting element. The first light guide and the second light guide are mounted on the holder and arranged in series. The first light guide has a first emitting surface, the second light guide has a second emitting surface, and the holder partially surrounds the first light guide and the second light guide. The first light-emitting element is disposed close to a first end of the first light guide. A light beam emitted by the first light-emitting element is reflected and converted by the first light guide into first linear light emitted from the first emitting surface. The second light-emitting element is disposed close to a first end of the second light guide. A light beam emitted by the second light-emitting element is reflected and converted by the second light guide into second linear light emitted from the second emitting surface.

In addition, the present invention further provides an optical assembly for a scanner. The optical assembly comprises a housing, the linear light source module, a reflecting mirror module, a lens and an image sensor. The linear light source module is mounted on the housing. The reflecting mirror module, the lens and the image sensor are disposed in the housing. The linear light source module illuminates an original with the first linear light and the second linear light. A light beam reflected by the original is reflected by the reflecting mirror module, passes through the lens and enters the image sensor. The image sensor obtains an optical signal representative of an image of the original.

Furthermore, the present invention also provides an optical assembly comprising a housing, and a first light guide, a second light guide, a first light-emitting element, a second light-emitting element, a lens array and an image sensor disposed in the housing. The first light guide and the second light guide are serially disposed in the housing. The first light guide has a first emitting surface and the second light guide has a second emitting surface. The first light-emitting element is disposed close to a first end of the first light guide and disposed in the housing. A light beam emitted by the first light-emitting element is reflected and converted by the first light guide into first linear light emitted from the first emitting surface. The second light-emitting element is disposed close to a first end of the second light guide and disposed in the housing. A light beam emitted by the second light-emitting element is reflected and converted by the second light guide into second linear light emitted from the second emitting surface. The lens array and the image sensor are disposed in the housing. The first linear light and the second linear light illuminate an original, a light beam reflected by the original passes through the lens array and reaches the image sensor, and the image sensor obtains an optical signal representative of an image of the original.

According to the linear light source module of the present invention and the optical assembly for the scanner, two shortened light guides are used in conjunction with the dual-side light-emitting design so that the deformation and warpage amounts can be easily controlled, and this is advantageous to the increase of the production margin of the injection molded product, the increase of the yield, the automatic mass production and the cost reduction. In addition, in the present invention, the gate, which is inevitably formed on the injection molded light guide, needs not to be further machined, and the light guides can be directly assembled into the linear light source module. This can eliminate the cost of additionally trimming the gate formed on one end of the light guide.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

FIG. 6 shows a front view of a linear light source module according to a third embodiment of the present invention.

FIG. 7 shows a front view of a linear light source module according to a fourth embodiment of the present invention.

DETAILED DESCRIPTION OF THE INVENTION

The present invention will be apparent from the following detailed description, which proceeds with reference to the accompanying drawings.

The linear light source module of the present invention includes two light guides disposed in series to achieve the two-side light inputting effect and the above-mentioned object.

Figure 1:
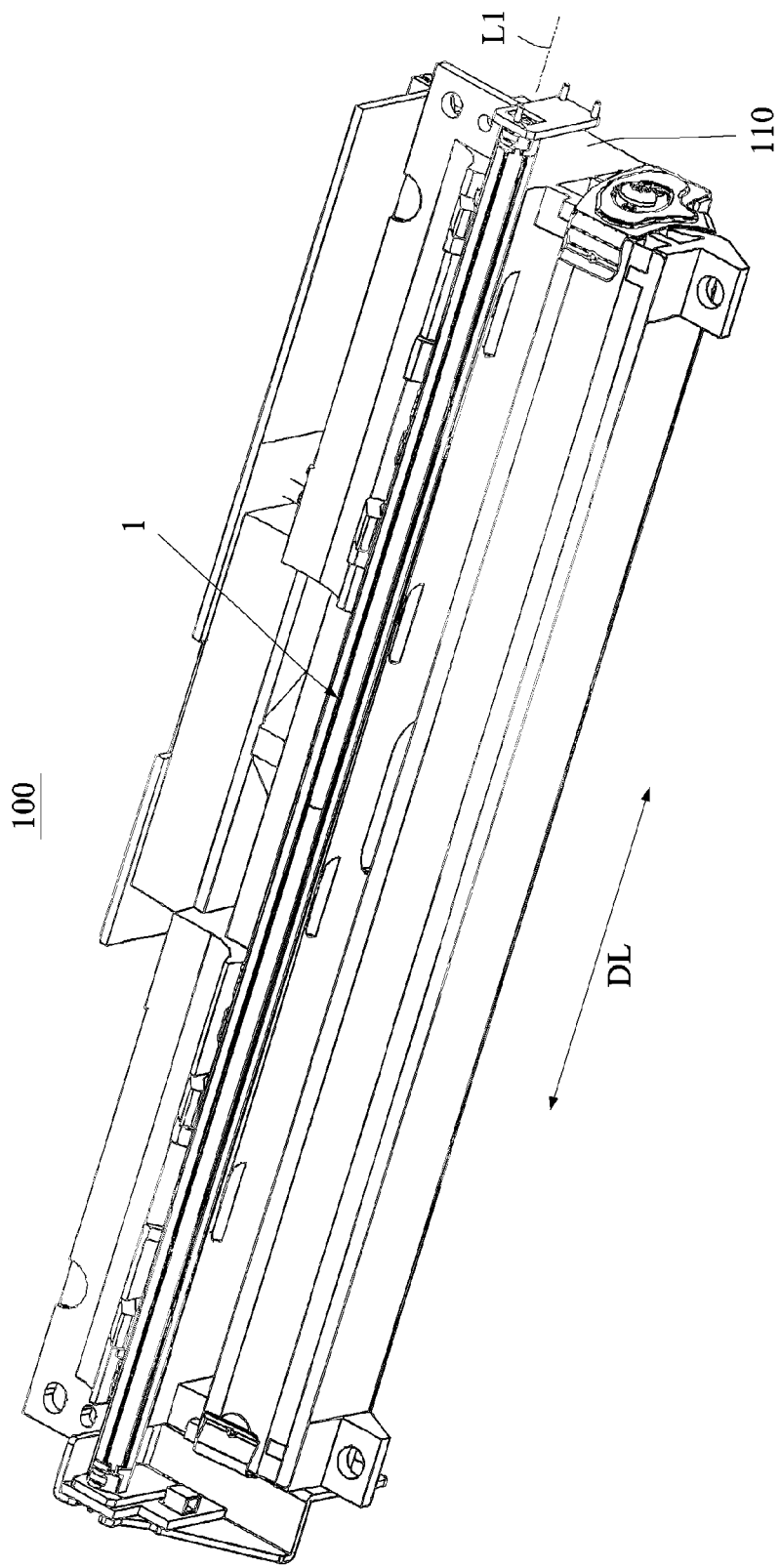
FIG. 1 shows a pictorial view of an optical assembly for a scanner according to a first embodiment of the present invention.
Figure 2:
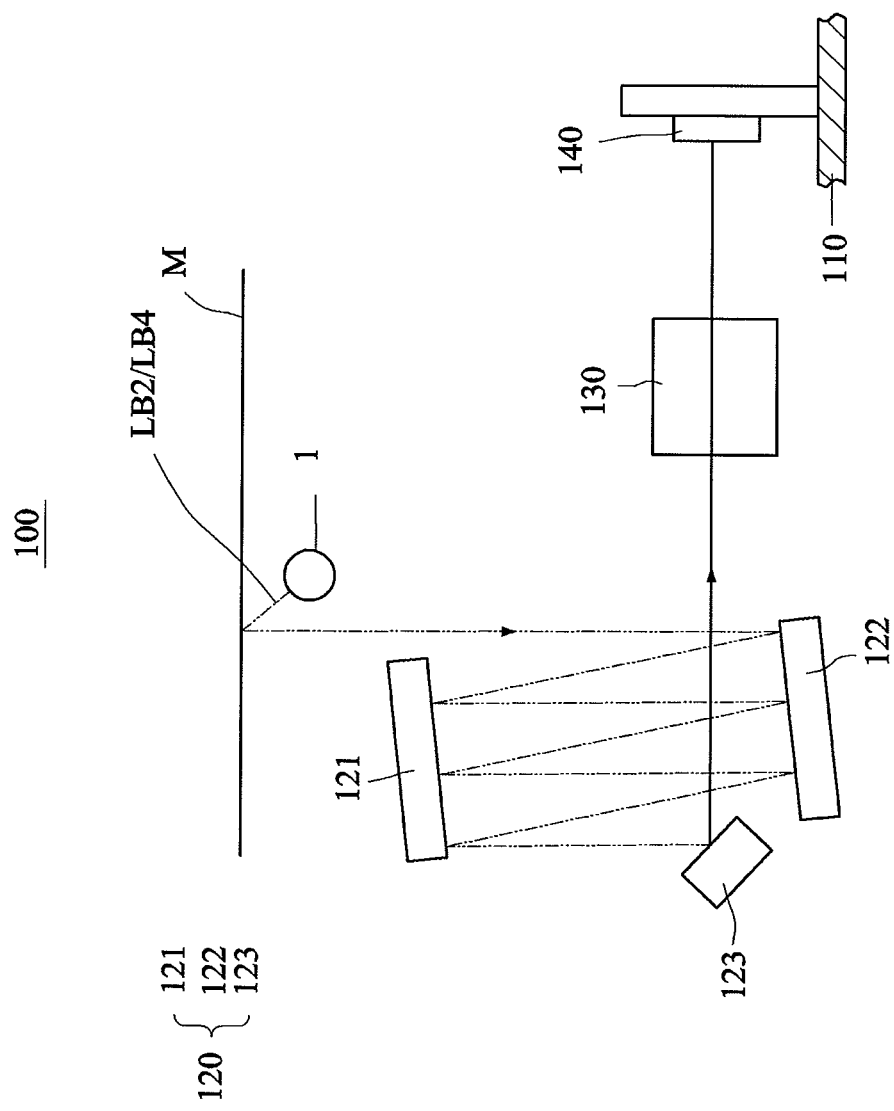
FIG. 2 shows a schematic view of the configuration of the optical assembly for the scanner of FIG. 1.

FIG. 1 shows a pictorial view of an optical assembly 100 according to the first embodiment of the present invention. FIG. 2 shows a schematic view of the configuration of the optical assembly 100 of FIG. 1. Referring to FIGS. 1 and 2, the optical assembly 100 of this embodiment comprises a housing 110, a linear light source module 1, a reflecting mirror module 120, a lens 130 and an image sensor 140.

The linear light source module 1 is mounted on the housing 110 and provides first linear light LB2 and second linear light LB4. The reflecting mirror module 120, the lens 130 and the image sensor 140 are disposed in the housing 110. In this exemplary embodiment, the reflecting mirror module 120 comprises three reflecting mirrors 121, 122 and 123. However, the present invention is not restricted thereto because the number of the reflecting mirrors can be increased or decreased, or even one single reflecting mirror can be used. The linear light source module 1 outputs the first linear light LB2 and the second linear light LB4 to illuminate an original M. The light beam reflected by the original M is reflected by the reflecting mirror module 120 and passes through the lens 130 and reaches the image sensor 140, and the image sensor 140 obtains an optical signal representative of an image of the original M. That is, after the first linear light LB2 illuminates the original M, the first linear light LB2 is reflected from the original M to the reflecting mirror 122 and then reflected by the reflecting mirrors 122 and 121, and travels between the reflecting mirrors 122 and 121 several times. Thereafter, the reflecting mirror 122 reflects the light to pass through the lens 130 and reach the image sensor 140. In this embodiment, the image sensor 140 is a charge-coupled device (CCD) type image sensor.

Figure 3:
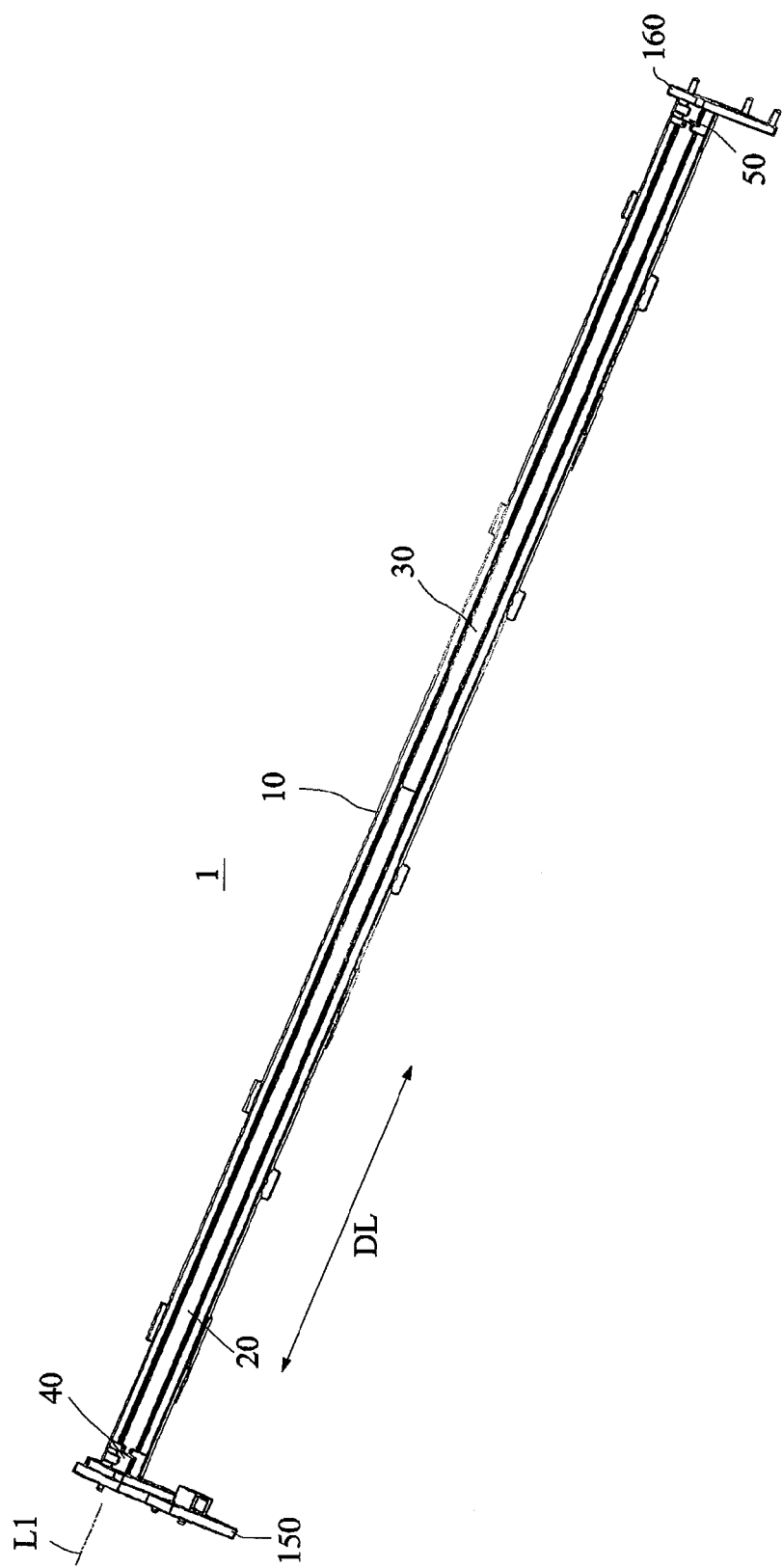
FIG. 3 shows a pictorial view of a linear light source module of FIG. 1.
Figure 4:
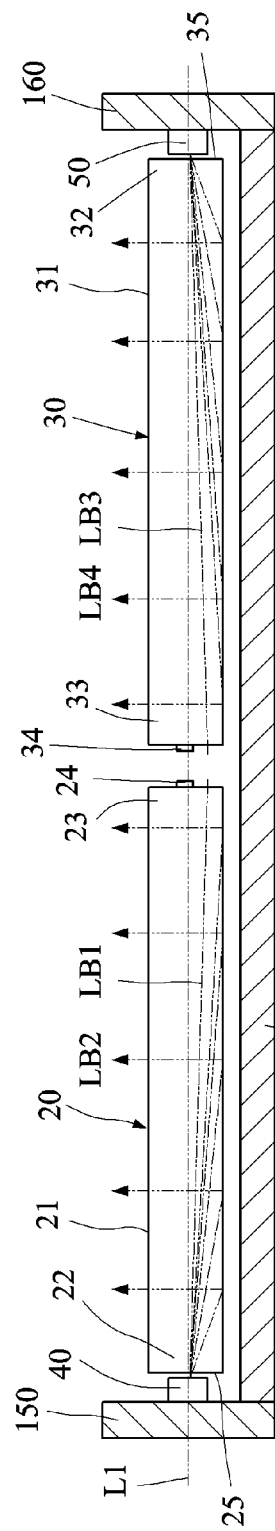
FIG. 4 shows a front view of the linear light source module of FIG. 1.

FIG. 3 shows a pictorial view of the linear light source module 1 of FIG. 1. FIG. 4 shows a front view of the linear light source module 1 of FIG. 1. Referring to FIGS. 3 and 4, the linear light source module 1 comprises a holder 10, a first light guide 20, a second light guide 30, a first light-emitting element 40 and a second light-emitting element 50. Furthermore, the optical assembly 100 further comprises two side plates 150 and 160, mounted on the housing 110.

In this exemplary but non-restrictive embodiment, the first light-emitting element 40 and the second light-emitting element 50 are light-emitting diodes (LEDs). The first light-emitting element 40 and the second light-emitting element 50 are disposed on two side plates 150 and 160, respectively.

The first light guide 20 and the second light guide 30 are mounted on the holder 10 and arranged in series and arranged on a straight line L1 extending in a longitudinal direction DL of the holder 10, which is also defined as a longitudinal direction of the housing 110 (see also FIG. 1). The first light guide 20 has a first emitting surface 21, and the second light guide 30 has a second emitting surface 31. The holder 10 partially surrounds the first light guide 20 and the second light guide 30 with the first emitting surface 21 and the second emitting surface 31 being exposed. The first light-emitting element 40 is disposed close to a first end 22 of the first light guide 20. A light beam LB1 emitted by the first light-emitting element 40 is reflected and converted by the first light guide 20 into the first linear light LB2 emitted from the first emitting surface 21. The second light-emitting element 50 is disposed close to a first end 32 of the second light guide 30. A light beam LB3 emitted by the second light-emitting element 50 is reflected and converted by the second light guide 30 into the second linear light LB4 emitted from the second emitting surface 31, wherein both the first linear light LB2 and the second linear light LB4 are emitted in an emitting direction substantially perpendicular to the longitudinal direction DL of the holder 10. In this embodiment, the first light guide 20 and the second light guide 30 are formed by way of injection molding, so a second end 23 of the first light guide 20 and a second end 33 of the second light guide 30 are formed with gates 24 and 34, respectively. The two gates 24 and 34 are arranged on the straight line L1. The gates 24 and 34 are inevitably formed after the injection molding but may also be trimmed by way of machining. The second end 23 of the first light guide 20 is disposed opposite the first end 22 of the first light guide 20, and the second end 33 of the second light guide 30 is disposed opposite the first end 32 of the second light guide 30. The first end 22 of the first light guide 20 and the first end 32 of the second light guide 30 are formed with light-permeable light input surfaces 25 and 35, respectively, to facilitate the entrance of the light beams LB1 and LB3 of the first light-emitting element 40 and the second light-emitting element 50. In this embodiment, the first end 22 of the first light guide 20, the second end 23 of the first light guide 20 disposed opposite the first end 22 of the first light guide 20, the first end 32 of the second light guide 30, and the second end 33 of the second light guide 30 disposed opposite the first end 32 of the second light guide 30 are disposed on the straight line L1. In addition, the first light-emitting element 40, the second light-emitting element 50, the first light guide 20 and the second light guide 30 are arranged on the straight line L1.

In this embodiment, a length of the first light guide 20 is equal to a length of the second light guide 30 to achieve the advantage that the first light guide 20 and the second light guide 30 have the same specification and thus can be produced in a mass production manner to decrease the cost. For example, a length of the light guide used in a linear light source module of a conventional A4-size scanner needs to reach 242 mm, while the length of each of the first light guide 20 and the second light guide 30 of this embodiment is shorter than 121 mm. Because the size of the light guide is reduced, the production speed and yield can be significantly enhanced.

Figure 5:
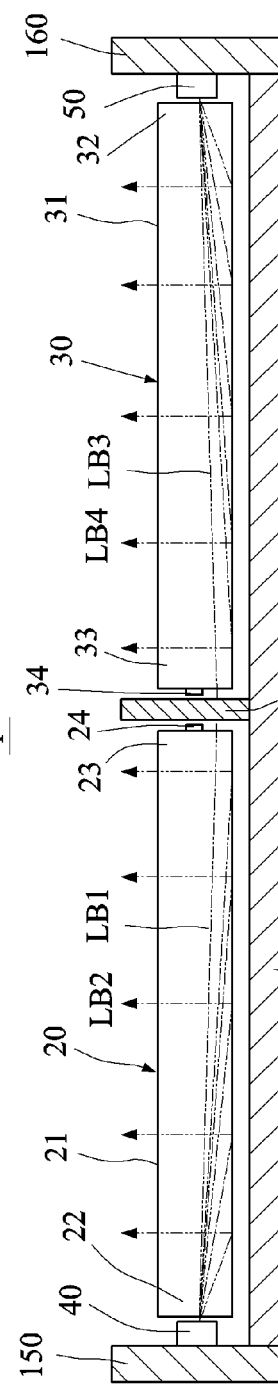
FIG. 5 shows a front view of a linear light source module according to a second embodiment of the present invention.

FIG. 5 shows a front view of a linear light source module 1' according to a second embodiment of the present invention. As shown in FIG. 5, the linear light source module 1' of this embodiment is similar to that of the first embodiment except that the linear light source module 1' further comprises a light eliminating element 60, disposed at a middle section of the holder 10 and between the first light guide 20 and the second light guide 30, for eliminating a portion of light beams outputted from the second end 23 of the first light guide 20 and the second end 33 of the second light guide 30. Thus, the brightness of the first linear light LB2 and the second linear light LB4 at the second ends 23 and 33 can be decreased.

FIG. 6 shows a front view of a linear light source module 1" according to a third embodiment of the present invention. As shown in FIG. 6, the linear light source module 1" of this embodiment is similar to that of the second embodiment except that the second end 23 of the first light guide 20 and the second end 33 of the second light guide 30 are formed with chamfers 26 and 36 for enhancing the brightness of the first linear light LB2 and the second linear light LB4 on the second ends 23 and 33 respectively. In addition, the linear light source module 1" further comprises reflective layers 70 and 80, disposed in the chamfers 26 and 36, for reflecting the light beams emitted by the first light-emitting element 40 and the second light-emitting element 50, respectively. It is to be noted that the reflective layers 70 and 80 can be eliminated because the chamfer may be designed to have the reflective surface. Furthermore, one single chamfer 26/36 and its corresponding single reflective layer 70/80 may also achieve the effect of the present invention.

FIG. 7 shows a front view of a linear light source module 1''' according to a fourth embodiment of the present invention. As shown in FIG. 7, this embodiment is similar to the first embodiment except that the length of the first light guide 20 is greater than the length of the second light guide 30. Thus, in a first mode, both the first light-emitting element 40 and the second light-emitting element 50 emit light beams; and in a second mode, the first light-emitting element 40 emits the light beam, while the second light-emitting element 50 does not emit the light beam. For example, the first mode is a full-size scan mode, in which the first light-emitting element 40 and the second light-emitting element 50 need to emit light. The second mode is a small-size scan mode, in which only the first light guide 20 needs to emit light, while the second light guide 30 needs not to emit light. When the scanner only needs to scan a small-size document, only the first light-emitting element 40 is controlled to emit light so that the energy can be saved.

Figure 8:
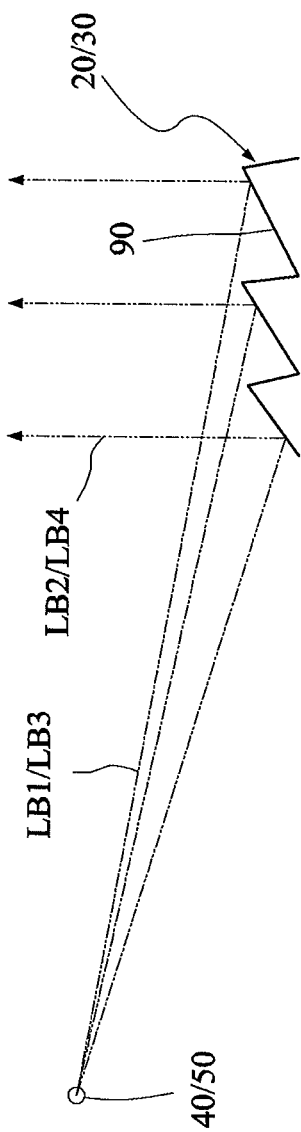
FIG. 8 shows a schematic view of a light reflecting structure of a light guide according to the present invention.

FIG. 8 shows a schematic view of a light reflecting structure 90 of the light guide 20/30 according to the present invention. As shown in FIG. 8, one or both of the first light guide 20 and the second light guide 30 has the light reflecting structure 90 for reflecting the light beams LB1 and LB3, outputted from the first light-emitting element 40 and the second light-emitting element 50, into linear light LB2 and LB4.

Figure 9:
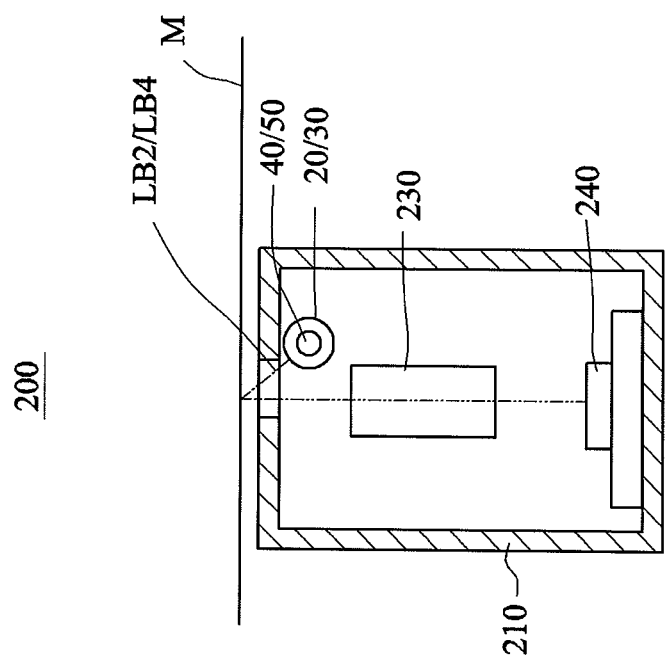
FIG. 9 shows a schematic view of the configuration of an optical assembly for a scanner according to a fifth embodiment of the present invention.

FIG. 9 shows a schematic view of the configuration of an optical assembly 200 for a scanner according to a fifth embodiment of the present invention. As shown in FIG. 9, this embodiment is similar to the first embodiment except that the optical assembly 200 of the fifth embodiment does not have the reflecting mirror provided in the first embodiment. Thus, the optical assembly 200 comprises a housing 210, the first light guide 20, the second light guide 30, the first light-emitting element 40 and the second light-emitting element 50 of the linear light source module 1, a lens array 230 and an image sensor 240. Referring to FIGS. 3 and 4, the first light guide 20 and the second light guide 30 are longitudinally serially disposed in the housing 210 in this embodiment. The first light-emitting element 40 is disposed close to the first end 22 of the first light guide 20 and disposed in the housing 210. The second light-emitting element 50 is disposed close to the first end 32 of the second light guide 30 and disposed in the housing 210. The lens array 230 and the image sensor 240 are disposed in the housing 110. The lens array 230 is composed of rod lens arranged in a one-dimensional array. The image sensor 240 is a contact image sensor (CIS). The first linear light LB2 outputted from the first light guide 20 and the second linear light LB4 outputted from the second light guide 30 illuminate the original M. Thereafter, the light beam reflected from the original M passes through the lens array 230 and reaches the image sensor 240. The image sensor 240 obtains an optical signal representative of an image of the original M.

According to the linear light source module of the present invention and the optical assembly for a scanner, two shortened light guides are used in conjunction with the dual-side light-emitting design so that the deformation and warpage amounts can be easily controlled, and this is advantageous to the increase of the production margin of the injection molded product, the increase of the yield, the automatic mass production and the cost reduction. In addition, in the present invention, the gate, which is inevitably formed on the injection molded light guide, needs not to be further machined, and the light guides can be directly assembled into the linear light source module. This can eliminate the cost of additionally trimming the gate formed on one end of the light guide.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A linear light source module, comprising:
   a holder;
   a first light guide and a second light guide, mounted on the holder and arranged in series and arranged on a straight line extending in a longitudinal direction of the holder, wherein the first light guide has a first emitting surface, the second light guide has a second emitting surface, and the holder partially surrounds the first light guide and the second light guide;
   a first light-emitting element, disposed close to a first end of the first light guide, wherein a light beam emitted by the first light-emitting element is reflected and converted by the first light guide into first linear light emitted from the first emitting surface; and
   a second light-emitting element, disposed close to a first end of the second light guide, wherein a light beam emitted by the second light-emitting element is reflected and converted by the second light guide into second linear light emitted from the second emitting surface.

2. The light source module according to claim 1, wherein each of the first end of the first light guide and the first end of the second light guide is formed with a light-permeable light input surface.

3. The light source module according to claim 1, wherein the first light guide has a second end and the second light guide has a second end, the second end of the first light guide is disposed opposite the first end of the first light guide, and the second end of the second light guide is disposed opposite the first end of the second light guide.

4. The light source module according to claim 3, wherein each of the second end of the first light guide and the second end of the second light guide is formed with a gate, and the two gates are arranged on the straight line.

5. The light source module according to claim 3, further comprising:
a light eliminating element, disposed at a middle section of the holder and between the first light guide and the second light guide, for eliminating a portion of light beams outputted from the second end of the first light guide and the second end of the second light guide.

6. The light source module according to claim 3, wherein at least one of the second end of the first light guide and the second end of the second light guide is formed with a chamfer, which enhances brightness of the first linear light or the second linear light on the second end.

7. The light source module according to claim 6, further comprising:
a reflective layer, disposed on the chamfer, for reflecting the first light-emitting element and the light beam emitted by the second light-emitting element.

8. The light source module according to claim 1, wherein at least one of the first light guide and the second light guide has a light reflecting structure.

9. The light source module according to claim 1, wherein a length of the first light guide is equal to a length of the second light guide.

10. The light source module according to claim 1, wherein a length of the first light guide is greater than a length of the second light guide; wherein in a first mode, both the first light-emitting element and the second light-emitting element emit the light beams; and in a second mode, the first light-emitting element emits the light beam, and the second light-emitting element does not emit the light beam.

11. An optical assembly for a scanner, comprising:
a housing;
the linear light source module according to claim 1, mounted on the housing; and
a reflecting mirror module, a lens and an image sensor disposed in the housing, wherein the linear light source module illuminates an original with the first linear light and the second linear light, a light beam reflected by the original is reflected by the reflecting mirror module, passes through the lens and enters the image sensor, and the image sensor obtains an optical signal representative of an image of the original.

12. The optical assembly according to claim 11, further comprising two side plates mounted on the housing, wherein the first light-emitting element and the second light-emitting element are disposed on the two side plates.

13. The light source module according to claim 1, wherein the first light-emitting element, the second light-emitting element, the first light guide and the second light guide are arranged on the straight line.

14. The light source module according to claim 1, wherein both the first linear light and the second linear light are emitted in an emitting direction substantially perpendicular to the longitudinal direction of the holder.

15. The light source module according to claim 1, wherein the first end of the first light guide, a second end of the first light guide disposed opposite the first end of the first light guide, the first end of the second light guide, and a second end of the second light guide disposed opposite the first end of the second light guide are disposed on the straight line extending in the longitudinal direction of the holder.

16. An optical assembly for a scanner, comprising:
a housing;
a first light guide and a second light guide, longitudinally serially disposed in the housing, wherein the first light guide has a first emitting surface and the second light guide has a second emitting surface;
a first light-emitting element, disposed close to a first end of the first light guide and disposed in the housing, wherein a light beam emitted by the first light-emitting element is reflected and converted by the first light guide into first linear light emitted from the first emitting surface;
a second light-emitting element, disposed close to a first end of the second light guide and disposed in the housing, wherein a light beam emitted by the second light-emitting element is reflected and converted by the second light guide into second linear light emitted from the second emitting surface; and
a lens array and an image sensor, disposed in the housing, wherein the first linear light and the second linear light illuminate an original, a light beam reflected by the original passes through the lens array and reaches the image sensor, and the image sensor obtains an optical signal representative of an image of the original, wherein the first end of the first light guide, a second end of the first light guide disposed opposite the first end of the first light guide, the first end of the second light guide, and a second end of the second light guide disposed opposite the first end of the second light guide are disposed on a straight line extending in a longitudinal direction of the housing.

* * * * *